(12) United States Patent
Williams

(10) Patent No.: US 7,066,361 B1
(45) Date of Patent: Jun. 27, 2006

(54) LANDING NET TRANSPORT DEVICE

(76) Inventor: Darren Williams, P.O. Box 7195, Jackson, WY (US) 83002

( * ) Notice: Subject to any disclaimer, the term of this patent is extended or adjusted under 35 U.S.C. 154(b) by 273 days.

(21) Appl. No.: 10/669,246

(22) Filed: Sep. 24, 2003

(51) Int. Cl.
A45F 5/02 (2006.01)

(52) U.S. Cl. .................. 224/194; 224/608; 224/617; 224/920

(58) Field of Classification Search ............ 224/194, 224/608, 617, 578, 579, 580, 586, 103, 920; 2/94, 340, 337, 95
See application file for complete search history.

(56) References Cited

U.S. PATENT DOCUMENTS

| 701,147 | A | * | 5/1902 | Caruthers | 2/324 |
|---|---|---|---|---|---|
| 1,426,024 | A | * | 8/1922 | Thureson | 2/94 |
| 1,626,166 | A | * | 4/1927 | Stair | 2/94 |
| 2,172,175 | A | * | 9/1939 | Probst | 224/621 |
| 2,637,133 | A | * | 5/1953 | Ross | 43/12 |
| 2,717,391 | A | * | 9/1955 | Bracken | 2/94 |
| 2,970,316 | A | * | 2/1961 | Silin | 2/94 |
| 4,272,852 | A | * | 6/1981 | Bell | 2/94 |
| 4,723,695 | A | | 2/1988 | Farber | 224/153 |
| 4,764,962 | A | * | 8/1988 | Ekman et al. | 381/301 |
| 4,980,988 | A | * | 1/1991 | Whitman | 43/54.1 |
| 5,117,538 | A | * | 6/1992 | Henry | 24/298 |
| 5,230,451 | A | * | 7/1993 | Onozawa | 224/194 |
| 5,651,141 | A | * | 7/1997 | Schneider | 2/94 |
| 5,655,695 | A | * | 8/1997 | Anderson et al. | 224/431 |
| 5,819,381 | A | * | 10/1998 | Lake | 24/564 |
| 5,852,828 | A | * | 12/1998 | Foster | 2/102 |
| 6,036,067 | A | * | 3/2000 | Alcorn | 224/153 |
| 6,237,825 | B1 | * | 5/2001 | Pencoske | 224/645 |
| 6,278,372 | B1 | * | 8/2001 | Velasco et al. | 340/573.1 |
| 2005/0011108 | A1 | * | 1/2005 | Noraker | 43/54.1 |

* cited by examiner

Primary Examiner—Nathan J. Newhouse
Assistant Examiner—Justin M. Larson
(74) Attorney, Agent, or Firm—Sturm & Fix LLP

(57) ABSTRACT

A transport device (10) for a landing net (50) wherein, the device (10) is adapted to be secured to selective portions of an angler's apparel such as the collar (101) and pockets (103) of a shirt and the angler's belt (102); and, wherein the device (10) includes a receptacle member (20) including a rear waterproof panel (21) and a front panel (23) having netting material (24). In addition, a securing unit (12) is associated with the receptacle member (20) and includes a plurality of clip members (30) each provided with strap elements (31) having lengths dimensioned to reach selected portions of an angler's apparel.

9 Claims, 2 Drawing Sheets

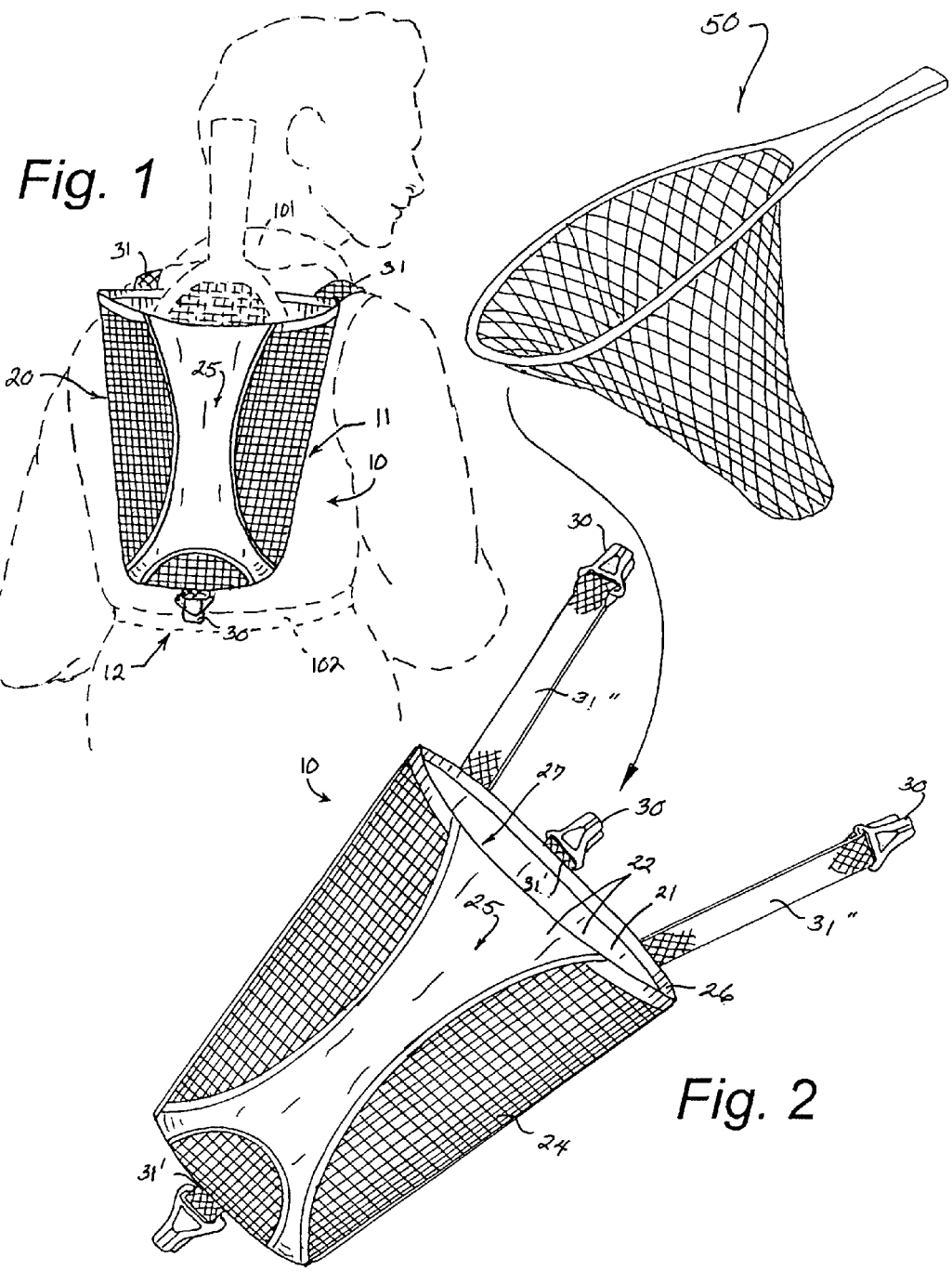

LANDING NET TRANSPORT DEVICE

CROSS REFERENCE TO RELATED APPLICATIONS

The present invention was the subject matter of Document Disclosure Program Registration Number 523,181, filed in the United States Patent and Trademark Office on Dec. 18, 2002.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of landing net transport devices in general; and, in particular to such a device incorporating a unique arrangement for attaching the device to the angler's clothing.

2. Description of Related Art

As can be seen by reference to the following U.S. Pat. Nos. 5,651,141; 6,036,067; 4,980,988; and, 4,723,695, the prior art is replete with myriad and diverse landing net carrying arrangements.

While all of the aforementioned prior art constructions are more than adequate for the basic purpose and function for which they have been specifically designed, they are uniformly deficient with respect to their failure to provide a simple, efficient, and practical backpack style net transport device that utilizes conventional clothing features as anchor points to secure the net transport device to the user's person while fishing.

Unfortunately, the current prior art constructions require specialized vests, or modifications to existing fishing-wear accessories including the landing net itself to produce the desired result which is both expensive for the angler and entirely unnecessary.

As a consequence of the foregoing situation, there has existed a longstanding need among anglers for a new and improved landing net transport device that attaches to conventional apparel features such as the angler's collar, belt, and shirt pockets to form a multi-point anchoring system for the landing net transport device; and, the provision of such a construction is the stated objective of the present invention.

BRIEF SUMMARY OF THE INVENTION

Briefly stated, the landing net transport device that forms the basis of the present invention comprises in general a receptacle unit and a securing unit to suspend the net transport device in a backpack fashion relative to the user's person.

As will be explained in greater detail further on in the specification, the receptacle unit comprises in general a receptacle member having a waterproof rear panel and a front panel including a substantial netting fabric component that promotes air circulation around the landing net, as well as, allowing residual water from the landing net to be drained away. Furthermore, waterproof material that forms the rear panel is incorporated into the front panel to provide structural strength to the finished construction, as well as, to form an attachment surface for the securing unit.

The securing unit comprises a plurality of clip members attached by different length strap elements to the receptacle member, wherein the shorter length strap members are provided to allow the receptacle member to be secured between the angler's collar and belt; and, wherein the longer strap members are provided to form an attachment between the top of the receptacle member and the pockets of a user's shirt.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the landing net transport device in use;

FIG. 2 is an exploded perspective view of the transport device and a conventional landing net; and, FIG. 3 is a side elevation view of the transport device in use with enlarged details of the receptacle member construction and the clip member.

DETAILED DESCRIPTION OF THE INVENTION

Figure 3:
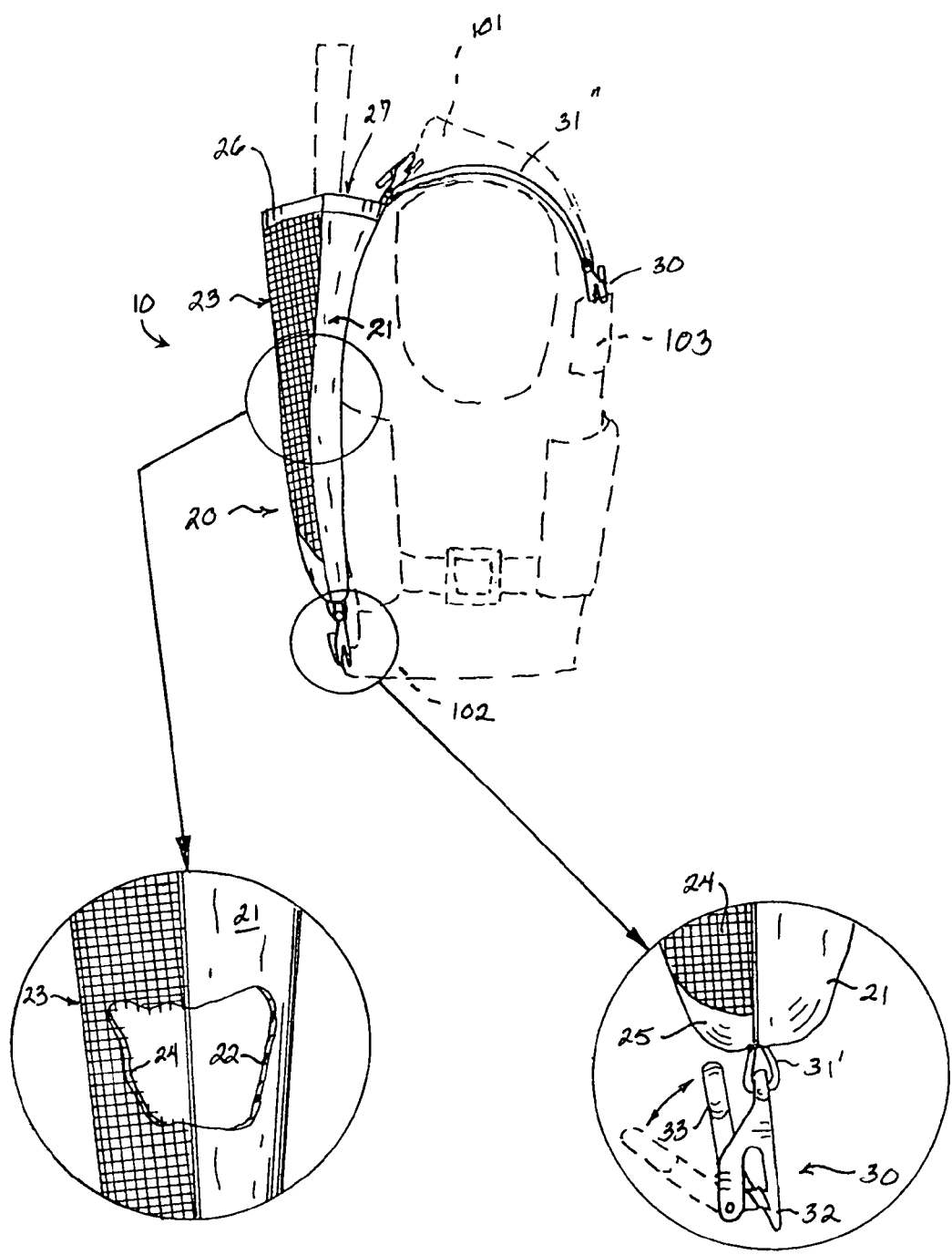

As can be seen by reference to the drawings, and in particularly to FIG. 1, the landing net transport device that forms the basis of the present invention is designated generally by the reference number 10. The transport device 10 comprises in general a receptacle unit 11 and a securing unit 12. These units will now be described in seriatim fashion.

As can be seen by reference to FIGS. 1 through 3, the receptacle unit 11 comprises a receptacle member 20 having a rear panel 21 fabricated from a sheet of waterproof material 22 and having a front panel 23 formed from a combination of generally stiff plaster netting material 24 and waterproof material 22 that forms a generally inverted I-shaped extension element 25 of the rear panel 21. This extension element 25 is further operatively connected to the rear panel 21 via a collar 26 that defines the opening 27 of the receptacle member 20 that is dimensioned to receive a conventional landing net 50.

Turning now in particular to FIGS. 2 and 3, it can be seen that the securing unit 12 comprises a plurality of clip members 30 wherein, each clip member 30 is attached by a strap element 31 to a selected portion of the rear panel 21 of the receptacle member 20 as will be explained presently.

Still referring to FIGS. 2 and 3, it can be seen that the central upper and lower portions of the rear panel 21 are provided with relatively short strap elements 31' 31' so that the clip members 30 suspend the receptacle member 20 between the collar 101 and belt 102 of a user's apparel.

In addition, the opposite sides of the upper portion of the rear panel 21 are provided with a pair of elongated strap elements 31" 31" wherein, the clip members 30 are adapted to engage the angler's shirt pockets 103 so that the receptacle member 20 is anchored at four points on the angler's clothing. Furthermore, as can best be seen by reference to FIG. 3, the clip member 30 has a stationary jaw element 32 and a lever actuated jaw element 33 that cooperate with one another in a well recognized fashion to establish a firm grip on the angler's apparel.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

The invention claimed is:

1. A transport device for landing nets adapted for attachment to an angler's apparel including a shirt having a collar and front pockets and a belt wherein, the device comprises
 a receptacle unit including a receptacle member having a rear panel fabricated from waterproof material and a front panel at least partially comprising netting material; and,
 a securing unit including a plurality of clip members; wherein said plurality of clip members are each provided with strap elements that connect the clip members to selective portions of the receptacle member; wherein at least two of the plurality of strap elements are dimensioned to extend from the upper portion of the receptacle member to a location proximate the front pockets of an angler's shirt; wherein at least one more of said plurality of strap elements is dimensioned to extend from the upper portion of the receptacle member to the collar of an angler's shirt; wherein said at least one more of said plurality of strap elements is substantially shorter in length than said at least two of the plurality of strap elements.

2. The device as in claim 1; wherein, at least one of the plurality of clip members is operatively associated with the lower portion of the receptacle member.

3. The device as in claim 1; wherein, at least one of the plurality of clip members is operatively associated with the upper portion of the receptacle member.

4. The device as in claim 2; wherein, at least one of the plurality of clip members is operatively associated with the upper portion of the receptacle member.

5. The device as in claim 1; wherein, at least one of the plurality of strap elements depends downwardly from the lower portion of the receptacle member to a point proximate an angler's belt.

6. The device as in claim 1; wherein, one of the plurality of strap elements extends upwardly from the upper portion of the receptacle member to the collar of an angler's shirt; and another one of the plurality of strap elements depends downwardly from the lower portion of the receptacle member to an angler's belt.

7. The device of claim 1 additionally comprising a top opening having no closure therefor.

8. A method of using a landing net transport device, said device comprising: a receptacle unit including a receptacle member having a rear panel fabricated of a waterproof material and a front panel at least partially comprising netting material, and a securing unit including a plurality of clip members; wherein said plurality of clip members are each provided with strap elements that connect the clip members to selective portions of the receptacle member; wherein said plurality of clip members are each provided with strap elements that connect the clip members to selective portions of the receptacle member; wherein at least two of the plurality of strap elements are dimensioned to extend from an upper portion of the receptacle member to a location proximate the front pockets of an angler's shirt; wherein at least one more of said plurality of strap elements is dimensioned to extend from the upper portion of the receptacle member to the collar of an angler's shirt; and wherein said at least one more of said plurality of strap elements is substantially shorter in length than said at least two of the plurality of strap elements, the method comprising:

(a) disposing the landing net transport device to a wearer's back;
 (b) affixing at least one clip member to clothing of the wearer near a waist of the wearer;
 (c) affixing at least one clip member to the clothing of the wearer near a neck of the wearer;
 (d) disposing at least one strap over a shoulder of the wearer;
 (e) attaching a first end of the at least one strap to the landing net transport device;
 (f) affixing a second end of the at least one strap to a front torso region of the wearer; and
 (g) engaging a landing net in the receptacle member, a handle of the landing net being disposed outside the receptacle member.

9. The method of claim 8 wherein engaging a landing net in the receptacle member comprises disposing the landing net handle entirely outside the receptacle member.

* * * * *